United States Patent
Ji et al.

(10) Patent No.: US 7,626,312 B2
(45) Date of Patent: *Dec. 1, 2009

(54) SURFACE ACOUSTIC WAVE LINEAR MOTOR, SURFACE ACOUSTIC WAVE LINEAR MOTOR PACKAGE, AND LENS ACTUATOR ADOPTING THE SURFACE ACOUSTIC WAVE LINEAR MOTOR PACKAGE

(75) Inventors: Chang-Hyeon Ji, Seoul (KR); Jong-Uk Bu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 531 days.

This patent is subject to a terminal disclaimer.

(21) Appl. No.: 11/341,222

(22) Filed: Jan. 26, 2006

(65) Prior Publication Data

US 2006/0170307 A1    Aug. 3, 2006

(30) Foreign Application Priority Data

Jan. 28, 2005    (KR) ...................... 10-2005-0008233

(51) Int. Cl.
*H01L 41/08* (2006.01)
*H01L 41/04* (2006.01)

(52) U.S. Cl. .............................. 310/313 R; 310/323.01; 310/323.11

(58) Field of Classification Search ............ 310/323.01, 310/323.02, 323.06, 323.09, 323.11
See application file for complete search history.

(56) References Cited

U.S. PATENT DOCUMENTS

| | | | | |
|---|---|---|---|---|
| 4,942,327 A | * | 7/1990 | Watanabe et al. ........ | 310/313 R |
| 5,006,749 A | * | 4/1991 | White .................... | 310/323.03 |
| 5,327,039 A | * | 7/1994 | Yamada ................... | 310/313 B |
| 5,750,243 A | * | 5/1998 | Shikata et al. ............... | 428/216 |
| 5,914,555 A | * | 6/1999 | Yoshino et al. .............. | 310/317 |
| 6,020,673 A | * | 2/2000 | Matsumoto ............ | 310/316.02 |
| 6,177,754 B1 | * | 1/2001 | Suzuki et al. ........... | 310/323.09 |
| 7,412,157 B2 | * | 8/2008 | Park et al. ....................... | 396/79 |
| 2001/0015591 A1 | | 8/2001 | Yoshida | |
| 2002/0101131 A1 | | 8/2002 | Asai | |
| 2004/0135470 A1 | * | 7/2004 | Iseki ....................... | 310/313 R |

FOREIGN PATENT DOCUMENTS

JP          11-285279         10/1999

* cited by examiner

*Primary Examiner*—J. SanMartin
(74) *Attorney, Agent, or Firm*—Lee, Hong, Degerman, Kang & Waimey (57) ABSTRACT

Disclosed herein are a surface acoustic wave linear motor that can be driven in opposite directions along a predetermined path, a package including the surface acoustic wave linear motor, and a lens actuator that is capable of performing an optical zoom function by adopting the surface acoustic wave linear motor package. The surface acoustic wave linear motor includes a substrate, through which a surface acoustic wave progresses, a movable part constructed such that the movable part can perform a translating movement in the opposite direction to the progressing direction of the surface acoustic wave, and electrodes for supplying the substrate with power to generate the surface acoustic wave in the substrate. According to the present invention, the surface acoustic wave linear motor is capable of performing a translating movement without the provision of an additional mechanism, unlike the conventional actuator using the rotary motor, the gear, and the lead screw. Furthermore, the surface acoustic wave linear motor is suitable for miniaturization and weight reduction, and therefore, various applications of the surface acoustic wave linear motor are possible.

12 Claims, 12 Drawing Sheets

SURFACE ACOUSTIC WAVE LINEAR MOTOR, SURFACE ACOUSTIC WAVE LINEAR MOTOR PACKAGE, AND LENS ACTUATOR ADOPTING THE SURFACE ACOUSTIC WAVE LINEAR MOTOR PACKAGE

Pursuant to 35 U.S.C. §119(a), this application claims the benefit of earlier filing date and right of priority to Korean Patent Application No. 10-2005-0008233 filed on Jan. 28, 2005, which is hereby incorporated by reference herein in its entirety.

BACKGROUND OF THE INVENTION

1. Field of the Invention

The present invention relates to a surface acoustic wave linear motor, a surface acoustic wave linear motor package, and a lens actuator adopting the surface acoustic wave linear motor package, and, more particularly, to a surface acoustic wave linear motor that can be driven in opposite directions along a predetermined path, a package including the surface acoustic wave linear motor, and a lens actuator that is capable of performing an optical zoom function by adopting the surface acoustic wave linear motor package.

The surface acoustic wave linear motor package according to the present invention is a housing for the motor that drives the movable part due to the deformation of the substrate or the wave motion at the surface of the substrate. The surface acoustic wave linear motor package has an additional function to improve the efficiency of the motor. The present invention enables the miniaturization and weight reduction of an actuating device, and therefore, the present invention can be suitably used in various kinds of applications, which require subminiature linear motor, such as portable communication terminals.

2. Description of the Related Art

With recent development of communication technologies and digital information processing technologies, portable communication terminal technologies integrated with various functions such as information process, operation, communication, and visual information input and output, have come to the front. Examples of such portable communication terminal technologies include personal digital assistants (PDAs) with digital camera and communication functions, and mobile phones with digital camera and PDA functions. As digital camera technologies progress and information storage capacities are increased, high-end digital camera modules are being increasingly mounted in the PDAs and the mobile phones.

As mega pixel image sensors are used in the digital camera modules, which are mounted, for example, in the portable communication terminals, the importance of additional functions, such as automatic focus and optical zoom, is being further highlighted. In order to realize the automatic focus and optical zoom functions in such small-sized digital camera modules, there is needed an actuator that satisfies various performance requirements, such as rapid start speed, low power consumption, and large displacement, while occupying relatively small volume. Especially, there is needed an actuator that is capable of corresponding to the increase of required displacement according to the improvement of the optical zoom function. However, a conventional magnetic actuator, such as a voice coil motor (VCM), has problems in that the increase of the displacement is limited, and power is continuously consumed while the zoom function is used. On the other hand, in the case that a lead screw is rotated by a rotary motor, such as a stepping motor, to linearly move a movable part, the mechanism is very complicated, and friction and noise are generated from a gear part. Also, the actuators using the voice coil motor and the stepping motor have a complicated structure. Consequently, it is difficult to manufacture the actuators inexpensively, and the miniaturization of the actuators is restricted.

SUMMARY OF THE INVENTION

Therefore, the present invention has been made in view of the above problems, and it is an object of the present invention to provide a linear motor package and a device including the linear motor package, which is applied to a camera module optical system to realize a subminiature optical zoom function.

It is another object of the present invention to provide a device that is capable of protecting the linear motor, which drives a lens group in the camera module optical system, and assisting with the functions of the linear motor using the linear motor package.

It is yet another object of the present invention to accomplish weight reduction and miniaturization of the camera module through the integration of the linear motor package.

In accordance with one aspect of the present invention, the above and other objects can be accomplished by the provision of a surface acoustic wave linear motor comprising: a substrate, through which a surface acoustic wave progresses; a movable part constructed such that the movable part can perform a translating movement in the opposite direction to the progressing direction of the surface acoustic wave; and electrodes for supplying the substrate with power to generate the surface acoustic wave in the substrate.

Preferably, the substrate is made of at least one compound selected from lithium niobate ($LiNbO_3$), lithium tantalite ($LiTaO_3$), and piezoelectric ceramic (PZT).

Preferably, the movable part is made of at least one material selected from semiconductor, ceramic, metal, and polymer.

Preferably, the linear motor further comprises: bonding pads connected to opposite tips of each electrode, respectively, and the electrodes are inter-digital electrodes.

Preferably, the linear motor further comprises: an upper pressing member disposed at the upper surface of the movable part for pressing the movable part and the substrate such that the movable part and the substrate can be brought into tight contact with each other.

Preferably, the linear motor further comprises: a lower pressing member disposed at the lower surface of the substrate for pressing the movable part and the substrate such that the movable part and the substrate can be brought into tight contact with each other.

Preferably, the upper pressing member and the lower pressing member are constituted by a combination of magnet-magnet, magnet-metal, or metal-magnet to press the movable part and the substrate such that the movable part and the substrate can be brought into tight contact with each other.

Preferably, the movable part is provided at the lower surface thereof with protrusions for increasing the pressure applied to the contact surface between the movable part and the substrate and preventing the slippage of the movable part.

Preferably, the protrusions are formed in the shape of an array, and each of the protrusions is formed in the shape of a circle, a diamond, a rectangle, or a sine wave.

Preferably, the movable part is provided at the lower surface thereof with an air flow channel for smoothly guiding air flow at the interface between the movable part and the substrate, and therefore, reducing damping due to the air, and the air flow channel is formed in the driving direction.

In accordance with another aspect of the present invention, there is provided a surface acoustic wave linear motor package comprising: a surface acoustic wave linear motor that can be driven by a surface acoustic wave generated at the surface of a substrate; a header part, on which the surface acoustic wave linear motor is mounted; and a cap for guiding the driving movement of the surface acoustic wave linear motor.

Preferably, the cap has a through-hole formed in the middle thereof.

Preferably, the header part includes a plurality of pins for separating the surface acoustic wave linear motor from the bottom by a predetermined distance.

Preferably, the linear motor package further comprises: insulating members disposed around the pins for accomplishing electrical insulation of the pins.

Preferably, the connection member protrudes outwardly through the through-hole.

In accordance with yet another aspect of the present invention, there is provided a lens actuator comprising: the surface acoustic wave linear motor package as described above; and a lens group connected to the surface acoustic wave linear motor included in the surface acoustic wave linear motor package.

Preferably, the lens group includes at least one zoom lens or at least one automatic focus lens.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings. In the drawings, the same or similar elements are denoted by the same reference numerals even though they are depicted in different drawings. In the following, a detailed description of known functions and configurations incorporated herein will be omitted when it may make the subject matter of the present invention rather unclear.

Figure 1A:
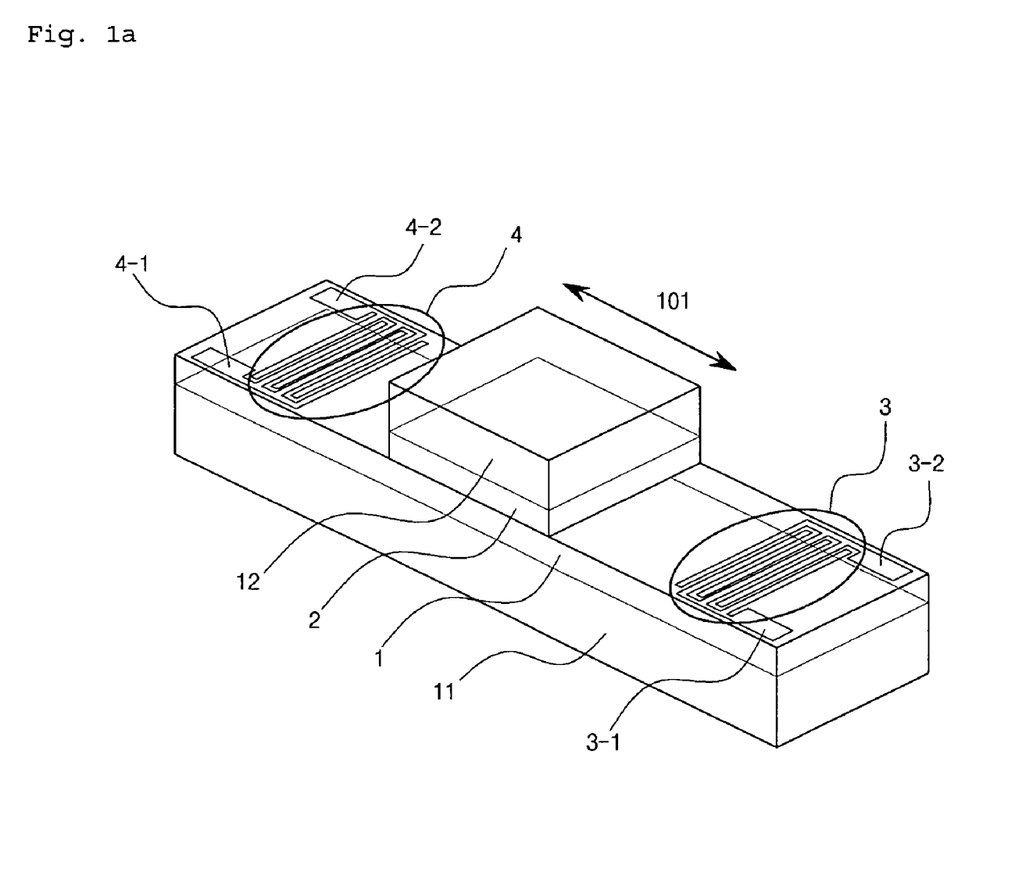
FIG. 1A is a perspective view illustrating a surface acoustic wave (SAW) linear motor according to a preferred embodiment of the present invention.

FIG. 1A is a perspective view illustrating a surface acoustic wave (SAW) linear motor according to a preferred embodiment of the present invention, and FIGS. 1B-1E are perspective views illustrating the interface between the substrate 1 and the movable part 2 of the surface acoustic wave linear motor according to the preferred embodiment of the present invention shown in FIG. 1A.

In the illustrated embodiment of the present invention, the surface acoustic wave linear motor comprises a substrate 1, a movable part 2, electrodes 3 and 4, bonding pads 3-1 and 3-2, bonding pads 4-1 and 4-2, a lower pressing member 11, and an upper pressing member 12.

In this embodiment of the present invention, the substrate 1 and the movable part 2 are pressed by the lower pressing member 11 and the upper pressing member 12.

Referring to FIG. 1A, the movable part 2 is attached on the substrate 1. The upper pressing member 12 is disposed at the upper surface of the movable part 2, and the lower pressing member 11 is disposed at the lower surface of the substrate 1. The movable part 2 is located in the middle of the substrate 1. The electrodes 3 and 4 are disposed at opposite ends of the upper surface of the substrate 1, respectively. The bonding pads 3-1 and 3-2 are connected to opposite tips of the electrode 3, respectively. Similarly, the bonding pads 4-1 and 4-2 are connected to opposite tips of the electrode 4, respectively.

As shown in FIG. 1A, the substrate 1, where a surface acoustic wave is generated, and the movable part 2 are pressed by the lower pressing member 11, which is disposed at the lower surface of the substrate 1, and the upper pressing member 12, which is disposed at the upper surface of the movable part 2, such that the substrate 1 and the movable part 2 can be brought into tight contact with each other at ca predetermined pressure.

When a predetermined radio frequency (RF) voltage is applied to the electrodes 3 and 4 disposed at the opposite ends of the substrate 1, i.e., inter-digital electrodes 3 and 4 through the bonding pads 3-1 and 3-2 or 4-1 and 4-2, the movable part 2 is driven along with the upper pressing member 12, as indicated by an arrow 101. The substrate 1 is generally made of a material allowing easy formation of a surface acoustic wave. Preferably, the substrate 1 is made of a piezoelectric material, such as lithium niobate ($LiNbO_3$), lithium tantalite ($LiTaO_3$), or piezoelectric ceramic (lead zirconate titanate: PZT).

The movable part 2 is generally made of a semiconductor material, such as silicon, a ceramic material, a metal material, or a polymer material. Preferably, the movable part 2 is made of a material allowing easy formation of minute protrusions at the contact surface between the movable part 2 and the substrate 1.

The pressing members 11 and 12 serve to apply a predetermined pressure to the substrate 1 and the movable part 2 such that the substrate 1 and the movable part 2 can be brought into tight contact with each other. If an additional pressing member for applying pressure to the movable part 2 is provided, the pressing members 11 and 12 may be selectively used. When the lower pressing member 11 and the upper pressing member 12 are constituted by a combination of magnet-magnet, magnet-metal, or metal-magnet, a predetermined pressure can be applied to the movable part 2 without using an additional pressing member. Specifically, the lower pressing member 11 and the upper pressing member 12 are moved toward each other due to a magnetic force generated by the magnet(s), and as a result, the substrate 1 and the movable part 2 are pressed by the lower pressing member 11 and the upper pressing member 12. Consequently, the substrate 1 and the movable part 2 are brought into tight contact with each other.

Figure 1B:
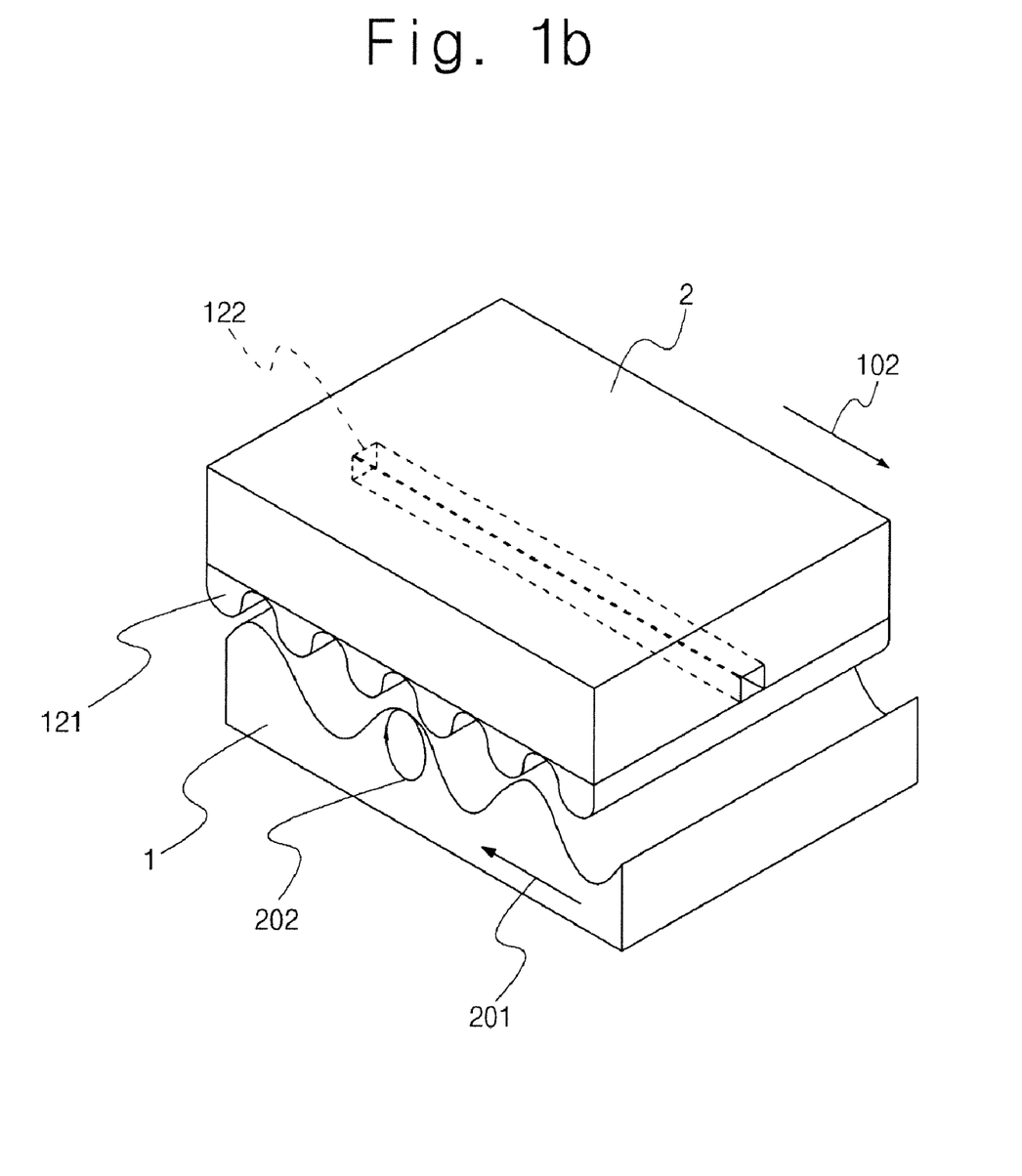
FIGS. 1B-1E are perspective views illustrating the interface between the substrate and the movable part of the surface acoustic wave linear motor according to the preferred embodiment of the present invention shown in FIG. 1A.
Figure 1C:
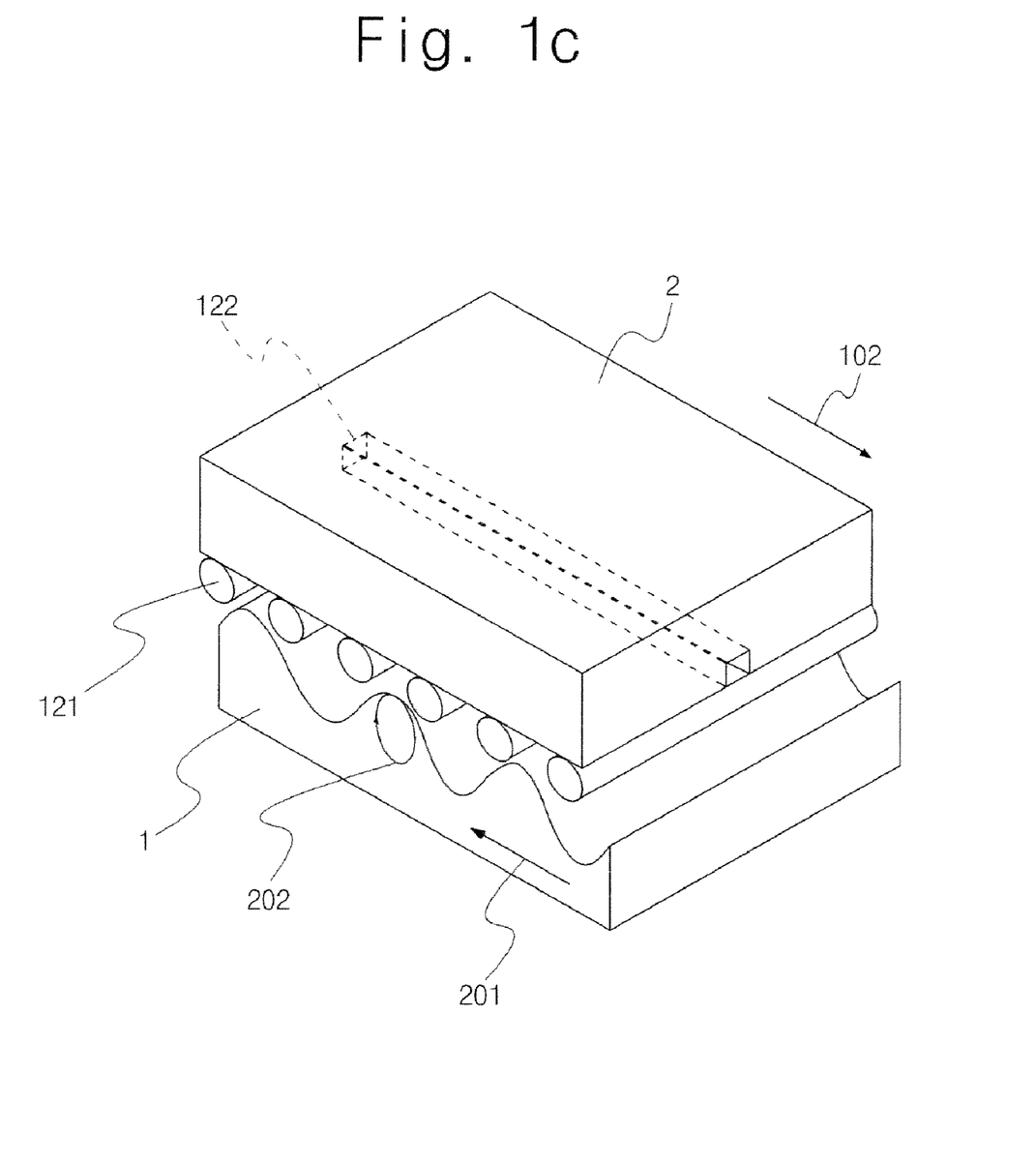
Figure 1D:
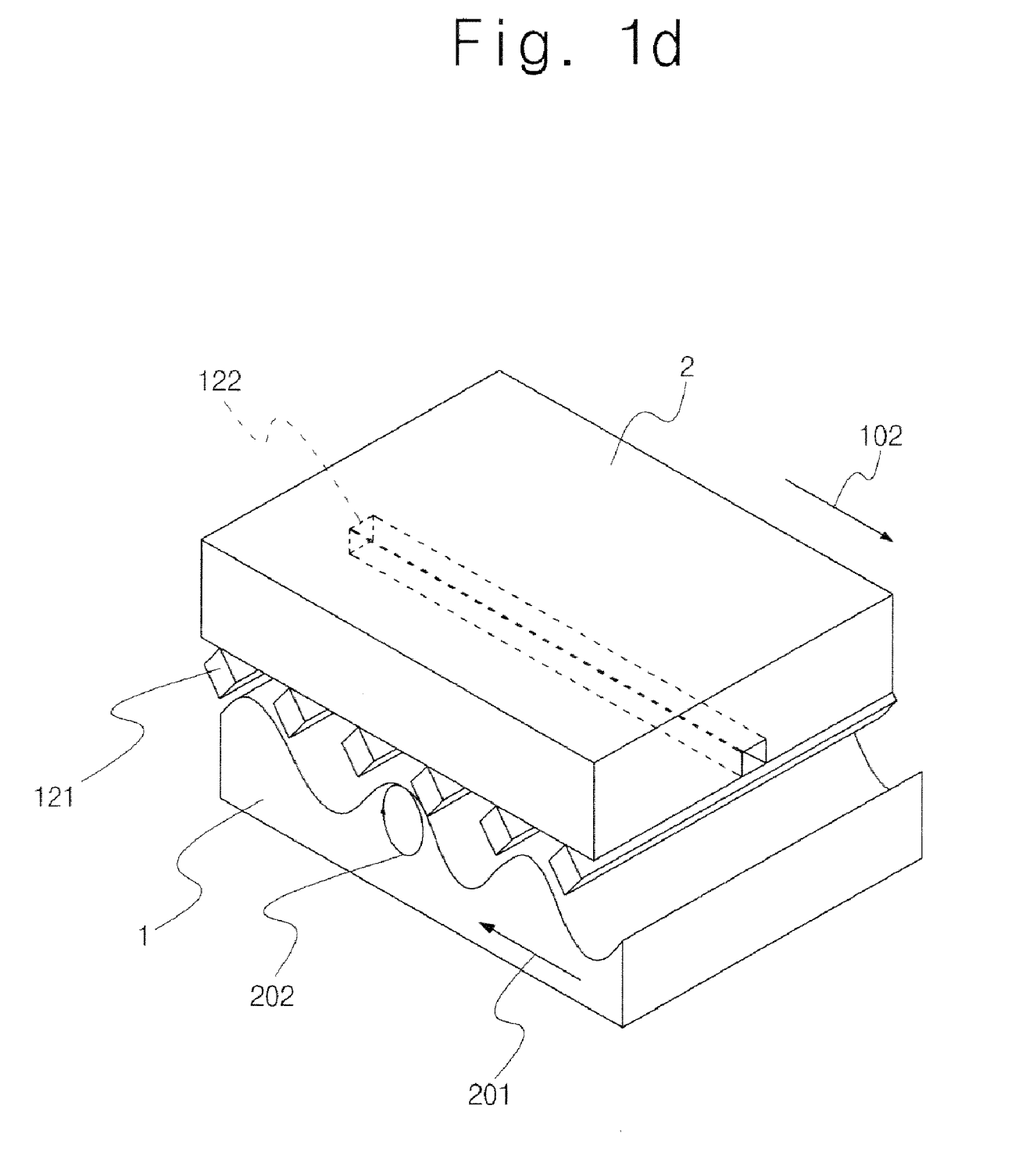
Figure 1E:
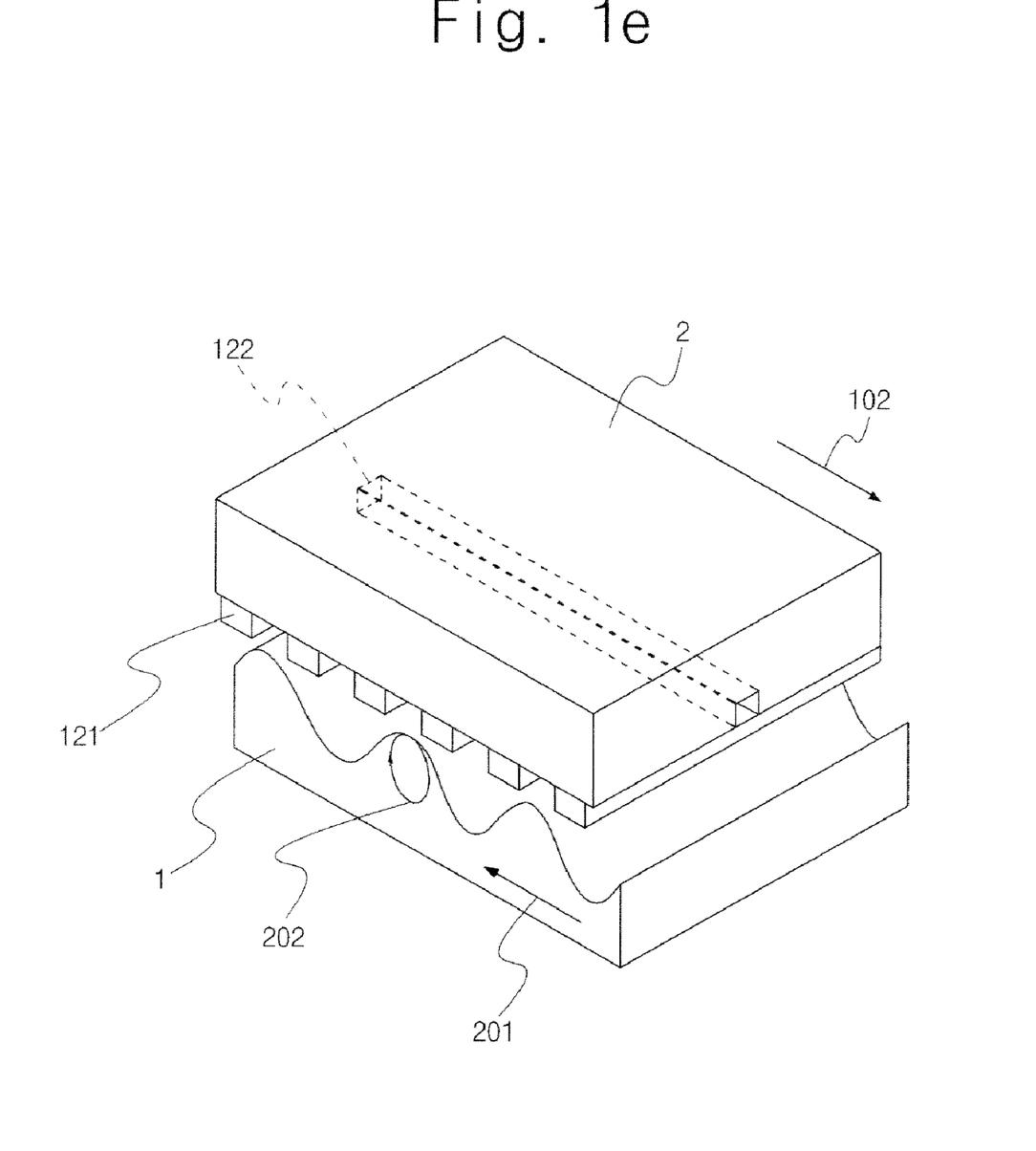

FIG. 1B illustrates, in an enlarged view, the interface between the substrate 1 and the movable part 2, such that the movable part 2 has a sine-wave-shaped protrusion 121. Alternatively, FIGS. 1C-1E respectively illustrate the movable part 2 having a circle-shaped protrusion 121, a diamond-shaped protrusion 121, and a rectangle-shaped protrusion 121.

When a surface acoustic wave progresses to the left, as indicated by an arrow 201, on the drawing, a particle motion is carried out in the clockwise direction, as indicated by an arrow 202, on the upper surface of the substrate 1. As a result, the movable part 2 is moved to the right, as indicated by an arrow 102. Consequently, it is preferable to optimize the efficiency in conversion of the particle movement on the upper surface of the substrate 1 due to the surface acoustic wave into the translating movement of the movable part 2, which may be accomplished by optimizing the pressure applied to the substrate 1 and the movable part 2 by the pressing members 11 and 12 and the shape of the contact surface between the substrate 1 and the movable part 2. Preferably, the movable part 2 is provided at the lower surface thereof with protrusions 121, which are formed in the shape of an array, by which the pressure applied to the contact surface between the movable part 2 and the substrate 1 is increased, and the slippage of the movable part is prevented while the surface acoustic wave linear motor is driven. Preferably, each protrusion is formed in the shape of a circle, a diamond, a rectangle, or a sine wave. Also, it is preferable to form an air flow channel 122 at the lower surface of the movable part 2 in the driving direction such that air flow is smoothly guided at the interface between the movable part 2 and the substrate 1 while the surface acoustic wave linear motor is driven, and therefore, damping due to the air is reduced.

Figure 2:
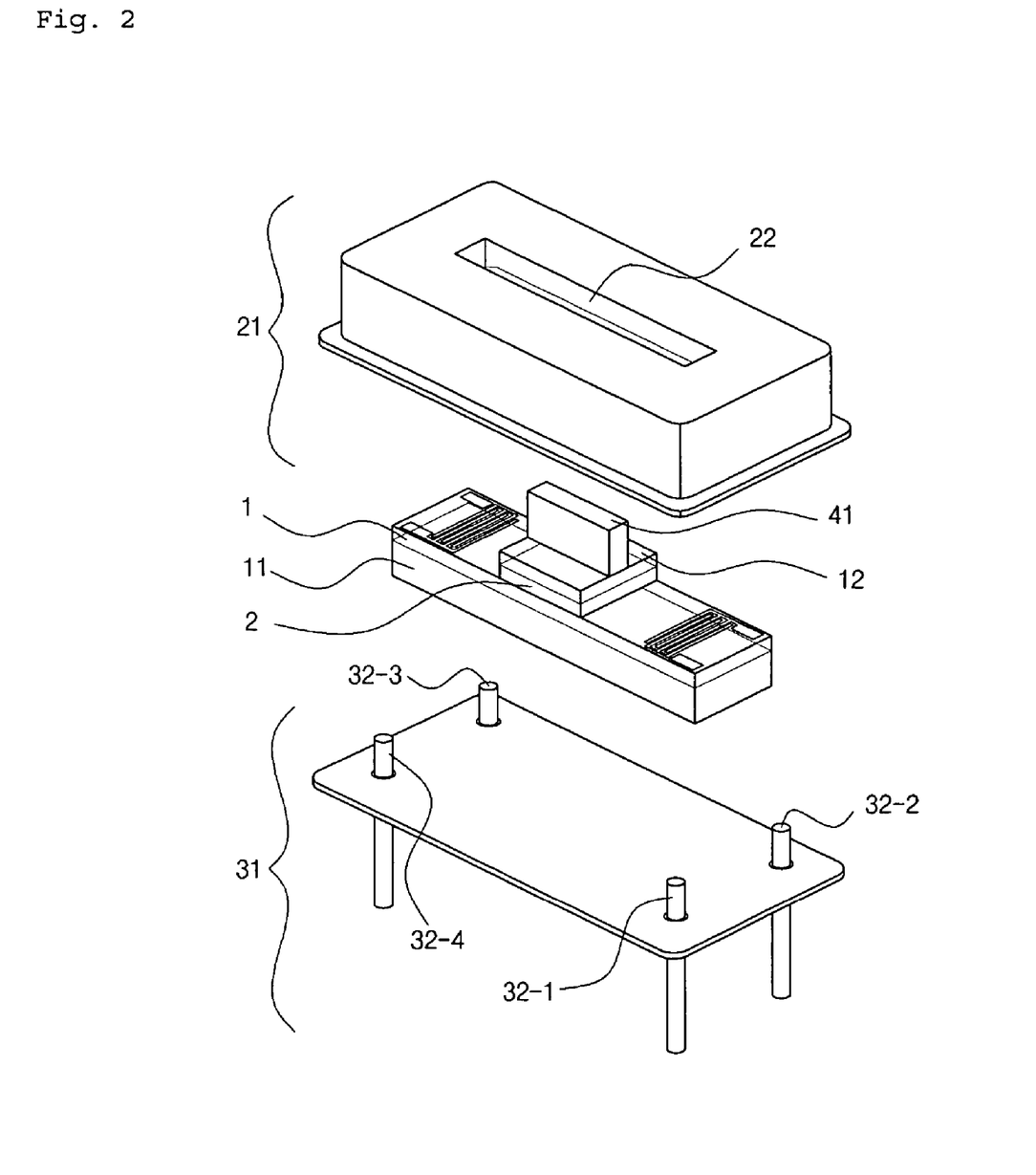
FIG. 2 is an exploded perspective view illustrating a surface acoustic wave linear motor package according to a preferred embodiment of the present invention.

FIG. 2 is an exploded perspective view illustrating a surface acoustic wave linear motor package according to a preferred embodiment of the present invention.

In the illustrated embodiment of the present invention, the surface acoustic wave linear motor package comprises a surface acoustic wave linear motor, a cap 21, and a header part 31.

In this embodiment of the present invention, a method of packaging the surface acoustic wave linear motor is schematically illustrated.

Referring to FIG. 2, the surface acoustic wave linear motor is supported by the header part 31 at the lower part thereof. The surface acoustic wave linear motor is packaged by the cap 21 at the upper part thereof. In the middle of the cap 21 is formed a through-hole 22, in which a connection member 41 of the surface acoustic wave linear motor is guided. The header part 31 includes pins 32-1, 32-2, 32-3, and 32-4, to which the surface acoustic wave linear motor is wire-bonded.

Specifically, as shown in FIG. 2, the surface acoustic wave linear motor package includes the cap 21 having the through-hole 22 and the header part 31 having the wire-bonding pins 32-1, 32-2, 32-3, and 32-4. The surface acoustic wave linear motor is mounted on the header part 31, and then the surface acoustic wave linear motor is wire-bonded. Subsequently, the cap 21 is attached to the header part 31. At this time, the connection member 41 attached to the upper surface of the upper pressing member 12 protrudes above the cap 21 through the through-hole 22. The lower pressing member 11 and the upper pressing member 12 are constituted by a combination of magnet-magnet, magnet-metal, or metal-magnet such that the pressure can be applied to the movable part 2 without using an additional mechanical pressing member.

Figure 3A:
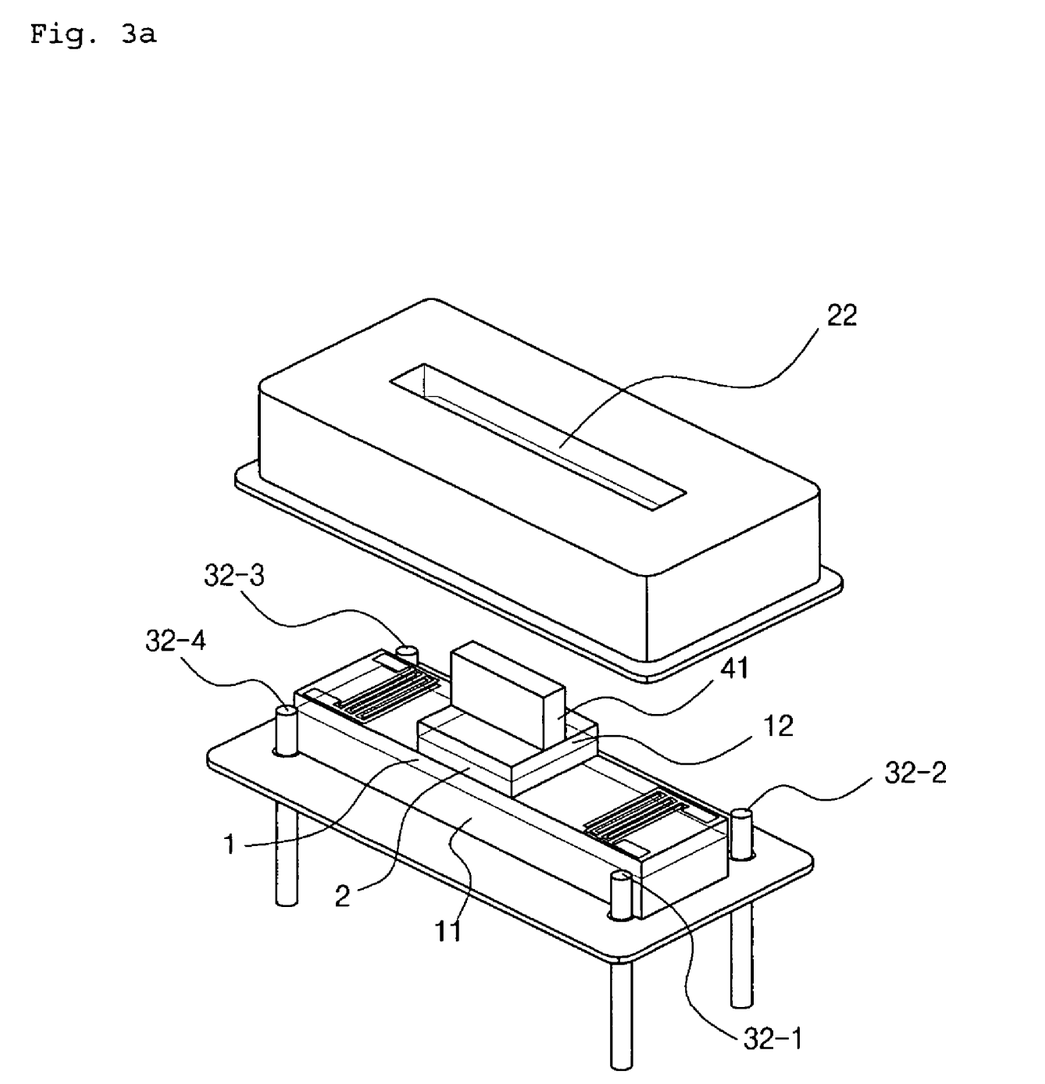
FIG. 3A is an exploded perspective view of the surface acoustic wave linear motor package shown in FIG. 2 illustrating a process of mounting the substrate using the lower pressing member according to a preferred embodiment of the present invention.
Figure 3B:
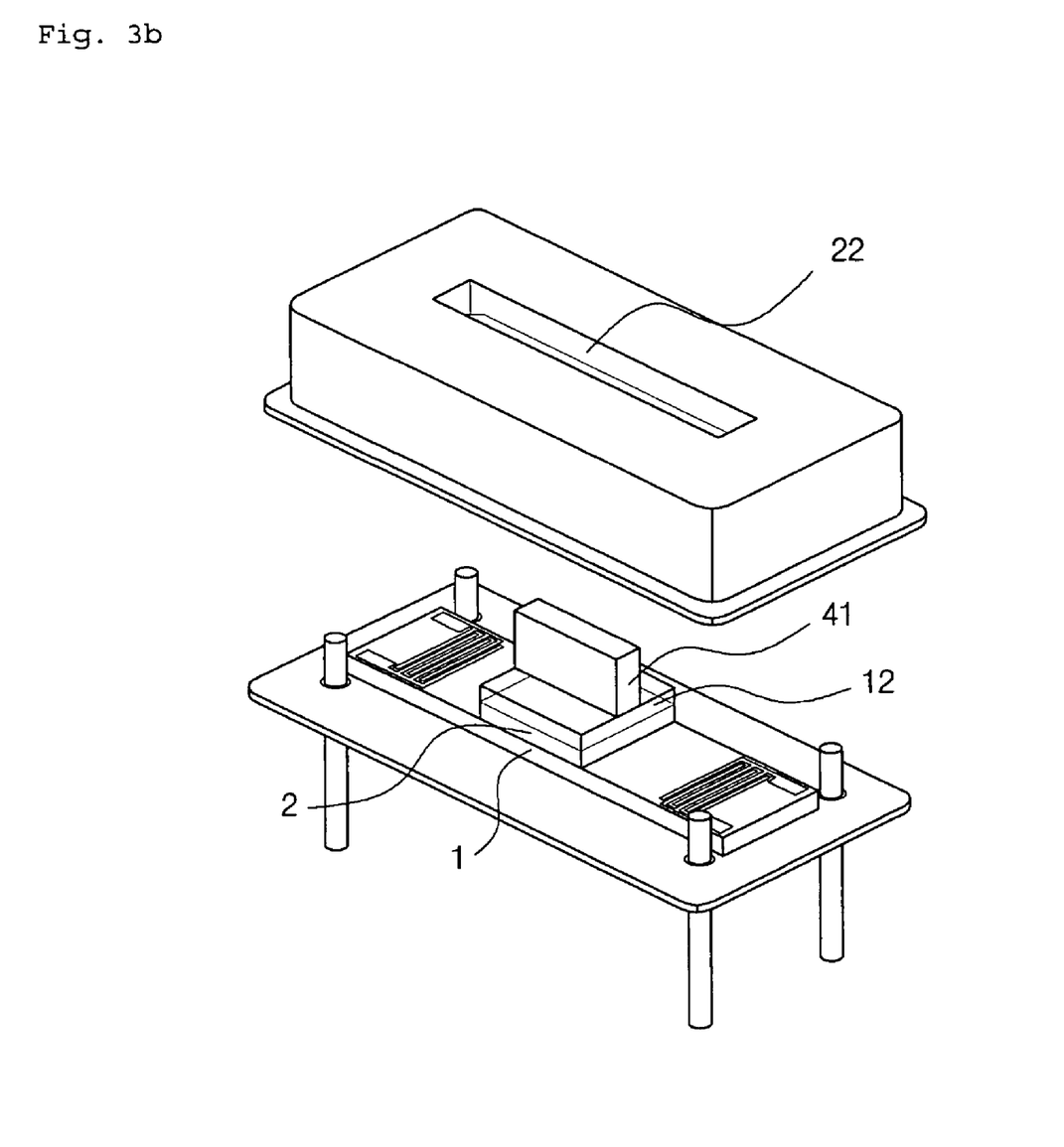
FIG. 3B is an exploded perspective view of the surface acoustic wave linear motor package shown in FIG. 2 illustrating a process of mounting the substrate without using the lower pressing member according to a preferred embodiment of the present invention.

FIG. 3A is an exploded perspective view of the surface acoustic wave linear motor package shown in FIG. 2 illustrating a process of mounting the substrate using the lower pressing member according to a preferred embodiment of the present invention, and FIG. 3B is an exploded perspective view of the surface acoustic wave linear motor package shown in FIG. 2 illustrating a process of mounting the substrate without using the lower pressing member according to a preferred embodiment of the present invention.

Referring to FIG. 3A, a permanent magnet is used as the lower pressing member 11. A permanent magnet or a metal having high relative permeability may be used as the upper pressing member 12.

Referring to FIG. 3B, the upper pressing member 12 is used while the lower pressing member 11 is not used. Preferably, a permanent magnet is used as the upper pressing member 12, and the header part 31 is made of a metal having high relative permeability.

Figure 4:
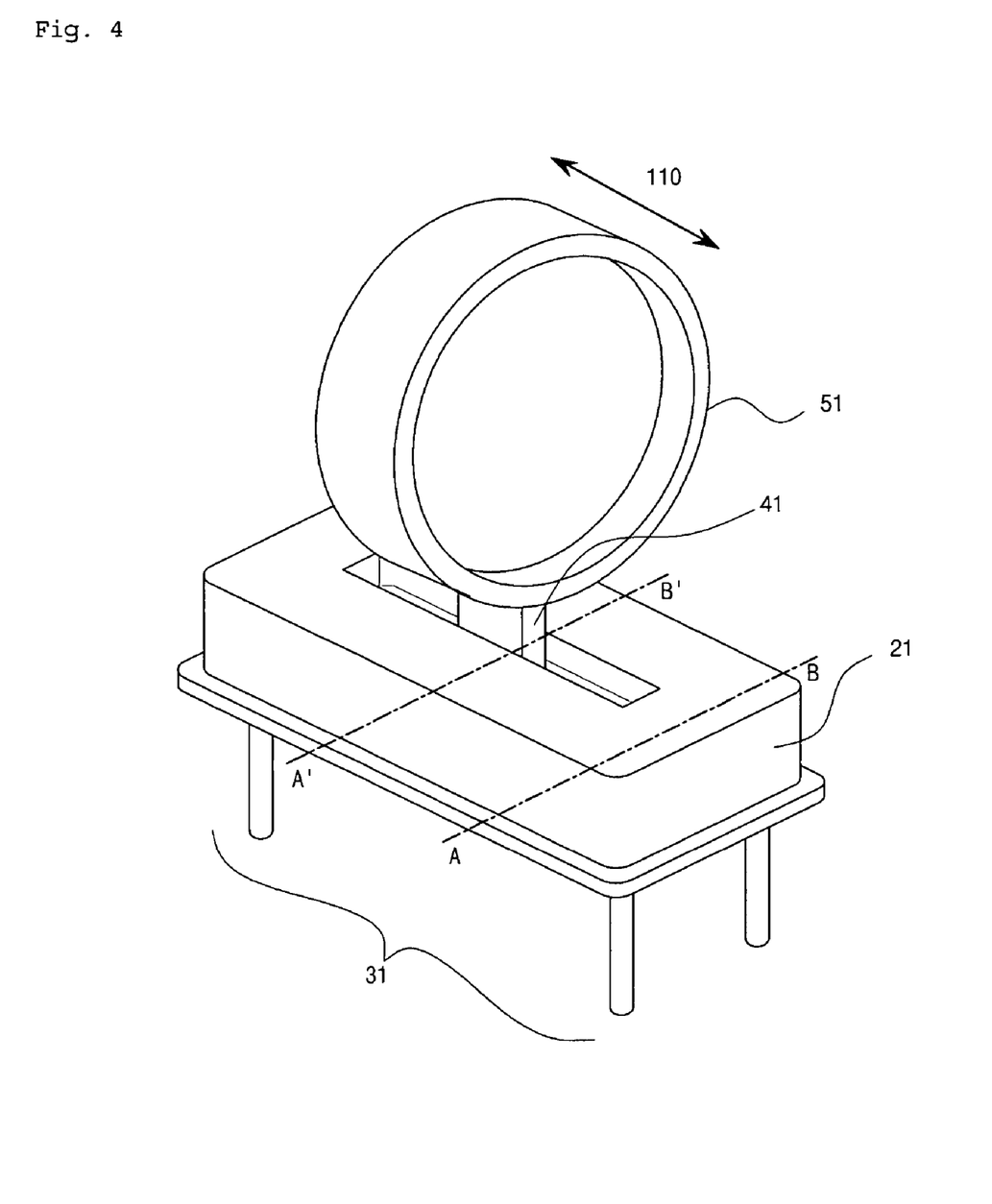
FIG. 4 is a perspective view schematically illustrating a lens actuator according to a preferred embodiment of the present invention, which is manufactured adopting the surface acoustic wave linear motor package shown in FIG. 2.

FIG. 4 is a perspective view schematically illustrating a lens actuator according to a preferred embodiment of the present invention, which is manufactured adopting the surface acoustic wave linear motor package shown in FIG. 2.

In the illustrated embodiment of the present invention, the lens actuator comprises a surface acoustic wave linear motor package and a lens group.

In this embodiment of the present invention, a method of coupling the lens group to the surface acoustic wave linear motor package is schematically illustrated.

Referring to FIG. 4, the lens group 51 is connected to the connection member 41, which protrudes through the through-hole formed at the cap 21 of the surface acoustic wave linear motor package, at a predetermined position of the circumferential surface thereof. Preferably, the lens group includes at least one zoom lens or at least one automatic focus lens.

Figure 5A:
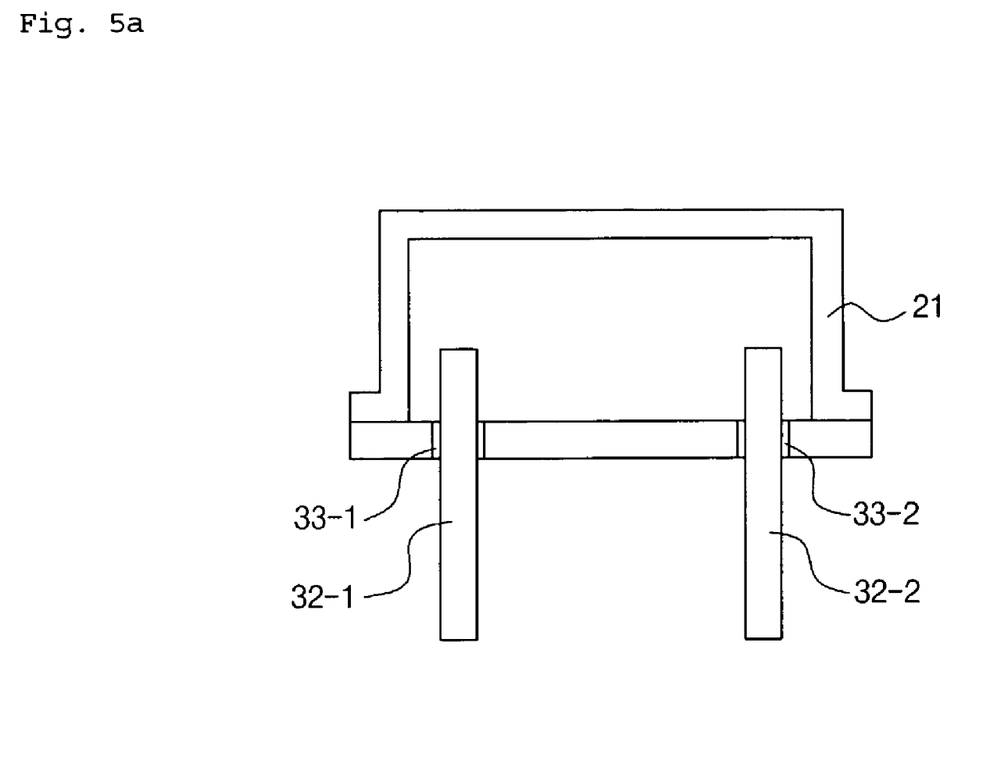
FIG. 5A is a cross-sectional view, illustrating the lens actuator according to the preferred embodiment of the present invention, taken along line A-B of FIG. 4.
Figure 5B:
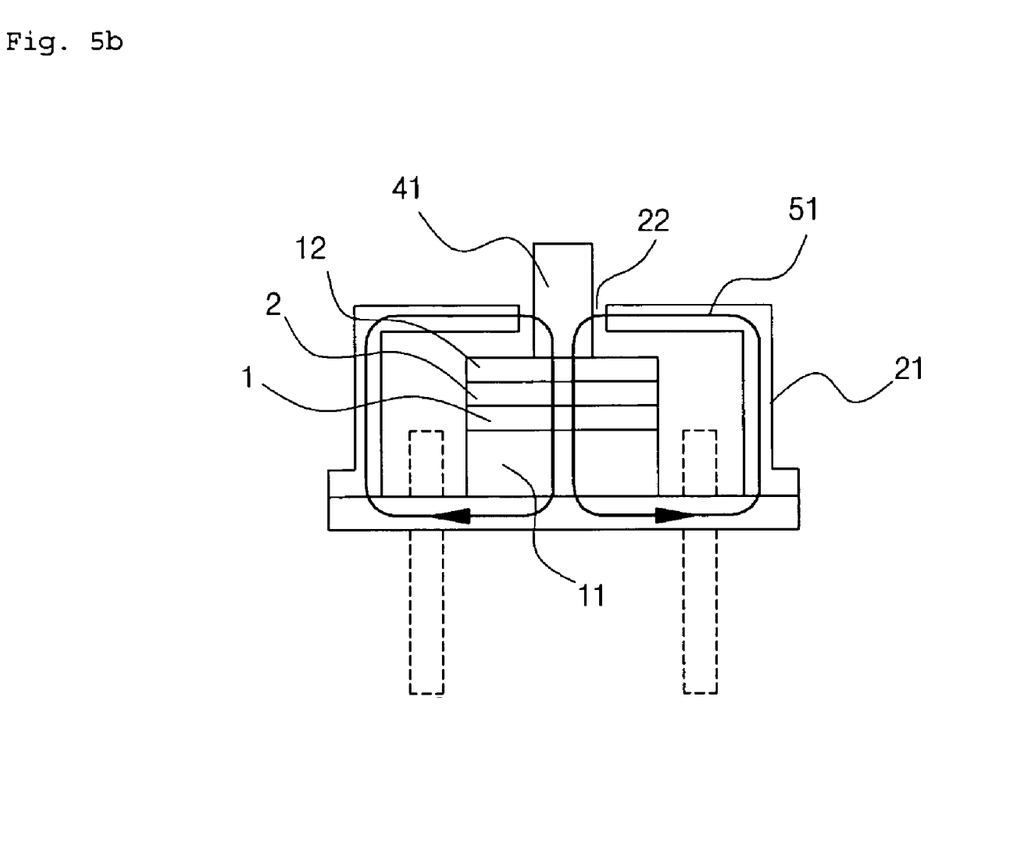
FIG. 5B is a cross-sectional view, illustrating the lens actuator according to the preferred embodiment of the present invention, taken along line A'-B' of FIG. 4 when the lower pressing member is used.
Figure 5C:
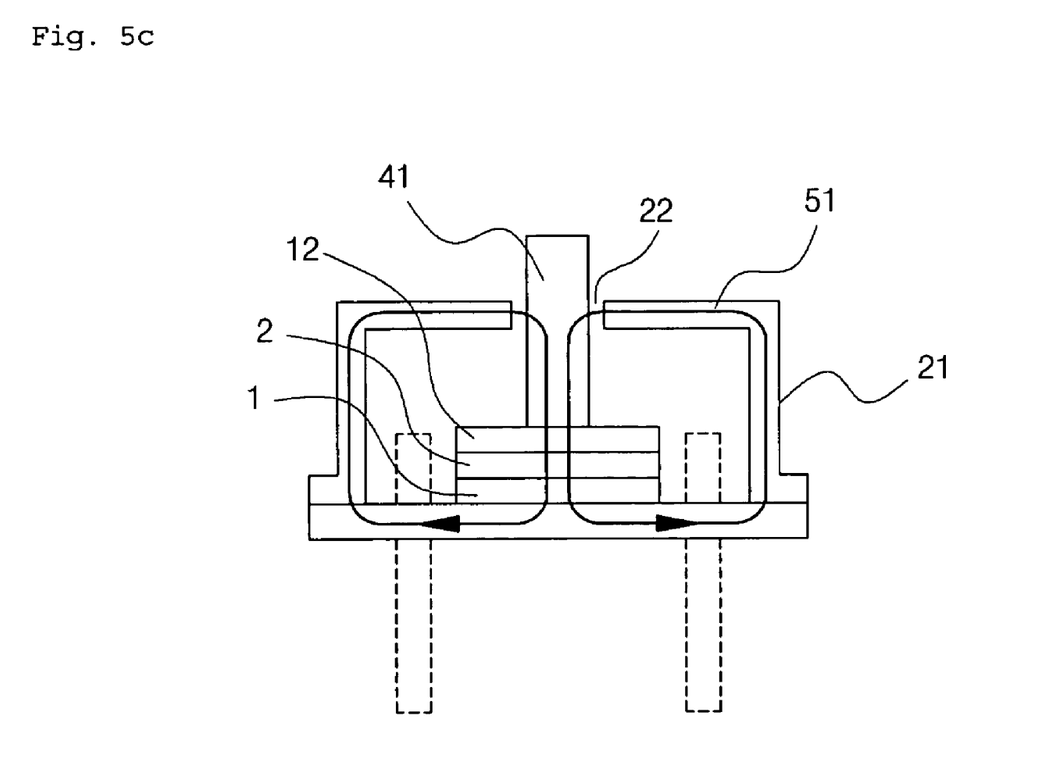
FIG. 5C is a cross-sectional view, illustrating the lens actuator according to the preferred embodiment of the present invention, taken along line A'-B' of FIG. 4 when the lower pressing member is not used.

FIG. 5A is a cross-sectional view, illustrating the lens actuator according to the preferred embodiment of the present invention, taken along line A-B of FIG. 4, FIG. 5B is a cross-sectional view, illustrating the lens actuator according to the preferred embodiment of the present invention, taken along line A'-B' of FIG. 4 when the lower pressing member is used, and FIG. 5C is a cross-sectional view, illustrating the lens actuator according to the preferred embodiment of the present invention, taken along line A'-B' of FIG. 4 when the lower pressing member is not used.

Specifically, FIG. 5A is a cross-sectional view illustrating the interior of the lens actuator adopting the surface acoustic wave linear motor package at the position where the surface acoustic wave linear motor is not located. Referring first to FIG. 5A, the wire-bonding pins 32-1 and 32-2 are connected to the outside through insulating members 33-1 and 33-2, by which the wire-bonding pins 32-1 and 32-2 are electrically insulated, respectively.

FIGS. 5B and 5C are cross-sectional views illustrating the interior of the lens actuator adopting the surface acoustic wave linear motor package at the position where the surface acoustic wave linear motor is located. Referring to FIG. 5B, the lower pressing member is used. Referring to FIG. 5C, the lower pressing member is not used. In the case of pressing the movable part 2 and the substrate 1 using the permanent magnet, it is preferable to manufacture the connection member 41, the header part, and the cap with a material having high relative permeability such that lines of magnetic force are distributed as shown in FIGS. 5B and 5C.

As apparent from the above description, the surface acoustic wave linear motor according to the present invention is capable of performing a translating movement without the provision of an additional mechanism, unlike the conventional actuator using the rotary motor, the gear, and the lead screw. Furthermore, the surface acoustic wave linear motor is suitable for miniaturization and weight reduction, and therefore, various applications of the surface acoustic wave linear motor are possible.

Especially when the surface acoustic wave linear motor is applied to an optical zoom and automatic focus camera module, the surface acoustic wave linear motor satisfies the required performance of the optical zoom and automatic focus camera module while occupying the minimum space. Consequently, the surface acoustic wave linear motor according to the present invention can be suitably used in various portable devices, such as personal digital assistants (PDAs) and mobile phones.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A surface acoustic wave linear motor comprising:
    a substrate, through which a surface acoustic wave progresses;
    a movable part constructed such that the movable part can perform a translating movement in the opposite direction to the progressing direction of the surface acoustic wave; and
    electrodes for generating the surface acoustic wave in the substrate,
    wherein the movable part has an air flow channel at a surface of the movable part adjacent the substrate for smoothly guiding air flow at the interface between the movable part and the substrate.

2. The linear motor as set forth in claim 1, wherein the substrate is made of at least one compound selected from lithium niobate ($LiNbO_3$), lithium tantalite ($LiTaO_3$), and piezoelectric ceramic (PZT).

3. The linear motor as set forth in claim 1, wherein the movable part is made of at least one material selected from semiconductor, ceramic, metal, and polymer.

4. The linear motor as set forth in claim 1, further comprising:
    bonding pads connected to opposite tips of each electrode, respectively.

5. The linear motor as set forth in claim 1, wherein the electrodes are inter-digital electrodes.

6. The linear motor as set forth in claim 1, further comprising:
    an upper pressing member disposed at the upper surface of the movable pert for pressing the movable part and the substrate such that the movable part and the substrate can be brought into tight contact with each other.

7. The linear motor as set forth in claim 6, further comprising:
    a lower pressing member disposed at the lower surface of the substrate for pressing the movable part and the substrate such that the movable part and the substrate can be brought into tight contact with each other.

8. The linear motor as set forth in claim 7, wherein the upper pressing member and the lower pressing member are constituted by a combination of magnet-magnet, magnet-metal, or metal-magnet to press the movable part and the substrate such that the movable part and the substrate can be brought into tight contact with each other.

9. The linear motor as set forth in claim 1, wherein the movable part is provided at the lower surface thereof with protrusions for increasing the pressure applied to the contact surface between the movable part and the substrate and preventing the slippage of the movable part.

10. The linear motor as set forth in claim 9, wherein the protrusions are formed in the shape of an array.

11. The linear motor as set forth in claim 9, wherein each of the protrusions is formed in the shape of a circle, a diamond, a rectangle, or a sine wave.

12. The linear motor as set forth in claim 1, wherein the air flow channel is formed in the driving direction.

* * * * *